(12) United States Patent
Anderson

(10) Patent No.: US 12,066,675 B1
(45) Date of Patent: Aug. 20, 2024

(54) OPTICAL FIBER TROUGH HAVING SPLIT DESIGN

(71) Applicant: FRONTIER COMMUNICATIONS HOLDINGS, LLC, Dallas, TX (US)

(72) Inventor: Timothy Anderson, Calimesa, CA (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/390,240

(22) Filed: Dec. 20, 2023

(51) Int. Cl.
G02B 6/44 (2006.01)

(52) U.S. Cl.
CPC ......... *G02B 6/4459* (2013.01); *G02B 6/4461* (2013.01)

(58) Field of Classification Search
CPC .............................. G02B 6/4459; G02B 6/4461
See application file for complete search history.

(56) References Cited

U.S. PATENT DOCUMENTS

| | | | | |
|---|---|---|---|---|
| 6,380,484 B1* | 4/2002 | Theis | ........................ | F16L 3/26 |
| | | | | 174/101 |
| 7,315,680 B1* | 1/2008 | Rapp | .................... | G02B 6/4459 |
| | | | | 248/68.1 |
| 7,696,434 B2* | 4/2010 | Ruddick | .............. | H02G 3/0418 |
| | | | | 138/108 |
| 8,488,936 B2* | 7/2013 | Sayres | ................. | G02B 6/4459 |
| | | | | 174/481 |
| 9,519,117 B2* | 12/2016 | Macall | ..................... | G02B 6/43 |
| 11,522,351 B2* | 12/2022 | Santelli, Jr. | .......... | H02G 3/0431 |

\* cited by examiner

*Primary Examiner* — Ryan A Lepisto
(74) *Attorney, Agent, or Firm* — MARSHALL, GERSTEIN & BORUN LLP

(57) ABSTRACT

A mounting system for an optical network includes a backboard member having a plurality of mounting regions, at least one networking component having a data input, at least one data cable communicatively coupled with the data input, and at least one fiber trough member operably coupled with the backboard member. The at least one networking component is operably coupled with the backboard member via one of the plurality of mounting regions. The at least one fiber trough member includes an elongated base surface having first and second ends and a body extending therebetween, a first elongated wall surface having a curved side profile, and a second elongated wall surface including at least one routing opening. The second elongated wall surface is adapted to overlap the first wall surface. The elongated base surface and first and second elongated wall surfaces define a cavity to retain the at least one data cable.

14 Claims, 4 Drawing Sheets

OPTICAL FIBER TROUGH HAVING SPLIT DESIGN

FIELD OF THE DISCLOSURE

This disclosure relates generally to networking systems, and, more particularly, to guiding and retention components for fiber networking systems.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. In some examples, an LMTU may be in the form of an optical network terminal (ONT) or an optical network unit (ONU) that is optically connected to the OLT via a respective distribution optical fiber received at the LMTU. Such ONTs are typically disposed within enclosures that may be affixed to a structure, a pole, and/or other suitable stationary objects.

In some environments such as datacenters, a number of networking components may be arranged on walls or other structures. Such components may be communicatively coupled with each other using fiber optic or other suitable cables and/or wires. In order to protect these cables from damage that may impact operation of the networking components, shields and/or tubing may be provided that is constructed from a generally rigid material capable of withstanding external impacts and/or damage. Existing shields oftentimes lack modularity and cannot be easily mounted to a wall or structure. In environments where flexible tubing is used, it may be difficult and/or impossible to mount such tubing to the desired structures. Further, in the event that the arrangement of networking components changes after an initial installation, such shields oftentimes require complete removal and/or replacement in order to accommodate alternative arrangements.

Accordingly, there is a need for improved devices having improved functionalities.

SUMMARY

In an embodiment, a mounting system for an optical network includes a backboard member having a plurality of mounting regions, at least one networking component having a data input, at least one data cable communicatively coupled with the data input, and at least one fiber trough member operably coupled with the backboard member. The at least one networking component is operably coupled with the backboard member via one of the plurality of mounting regions. The at least one fiber trough member includes an elongated base surface having first and second ends and a body extending therebetween, a first elongated wall surface having a curved side profile, and a second elongated wall surface including at least one routing opening. The second elongated wall surface is adapted to overlap the first wall surface. The elongated base surface and first and second elongated wall surfaces define a cavity to retain the at least one data cable.

In some examples, the elongated base surface of the at least one fiber trough member includes a plurality of mounting members adapted to couple with the backboard member. In some forms, the at least one fiber trough member includes first and second open ends. Further, in some examples, the at least one data cable is selectively routable through: 1) the first and second open ends; or 2) the at least one routing opening and one of the first or second open ends of the at least one fiber trough member.

In some approaches, the at least one fiber trough member is constructed from a polymeric material. In these and other approaches, the at least one fiber trough member may be constructed from a resilient material.

In some examples, the mounting system may further include at least one angled fiber trough member that includes an elongated base surface having a first end, a second end, and a body extending therebetween. The first and second ends may be oriented at an angle relative to each other. The angled fiber trough member may further include a first elongated wall surface extending from the elongated base surface, and a second a second elongated wall surface extending from the elongated base surface. The first elongated wall surface may have a curved side profile. The second elongated wall surface may include at least one routing opening thereon. The second elongated wall surface may be adapted to at least partially overlap the first wall surface.

In accordance with a second aspect, a fiber trough for retaining at least one optical fiber cable includes an elongated base surface having a first end, a second end, a body extending therebetween, a first elongated wall surface extending from the elongated base surface, and a second elongated wall surface extending from the elongated base surface. The first elongated wall surface includes a curved side profile. The second elongated wall surface includes at least one routing opening thereon and is adapted to at least partially overlap the first wall surface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
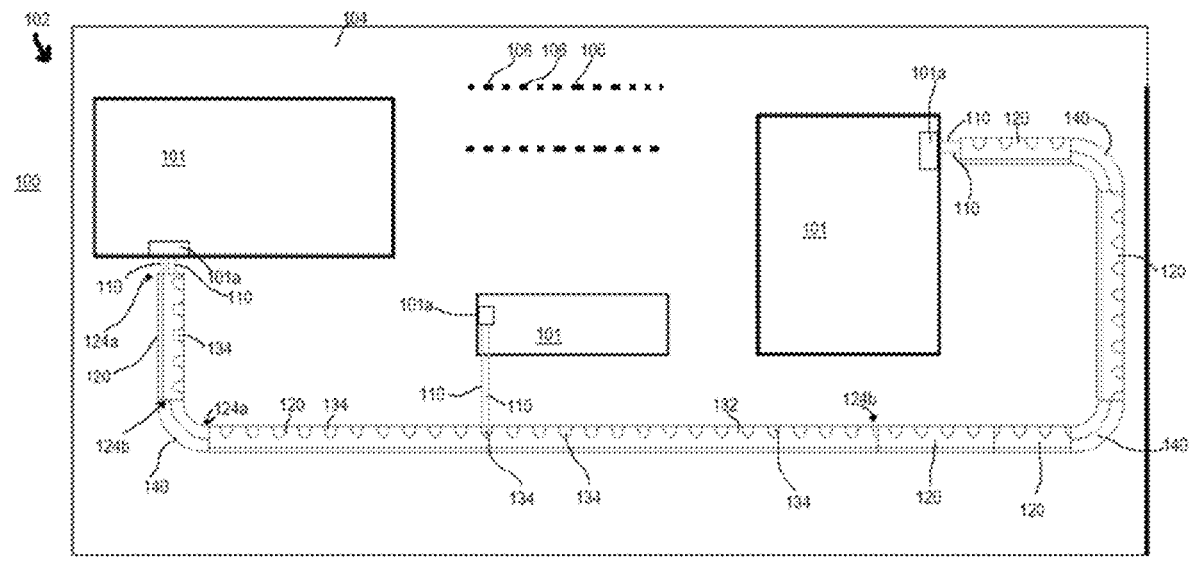
FIG. 1 is a block diagram of an example networking environment in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide several advantages over existing techniques for retaining components of networking systems while providing for increased flexibility and/or modularity. Generally speaking, a networking component, as utilized herein, may be in the form of a unit disposed at customer premises and/or data center. Such a component may be mounted to a fixed structure capable of receiving additional components as needed. The systems described herein may accommodate cabling of varying lengths and/or configurations and needn't be removed or destroyed in the event of a desired change in configurations.

Turning now to the Figures, an example environment 100 is provided that includes an example mounting system 102. In some forms, the environment 100 may be a datacenter (e.g., a colocation datacenter) having a number of computing components such as servers and/or other computing hardware. The mounting system 102 includes a backboard member 104 having any number of mounting regions 106, any number of networking components 101, any number of data cables 110, and any number of fiber trough members 120. In some examples, the backboard member 104 may be part of a wall or other structure of a building, but in other examples, the backboard member 104 may be a standalone wall or panel (e.g., a fire-rated panel having a thickness of approximately ¾" or more) that is secured or otherwise affixed with a wall or other structure of the building. The mounting region or regions 106 may be in the form of holes, brackets, or other components that allow the networking components 101 and/or fiber trough members 120 to be secured therewith.

The networking component or components 101 may be in the form of any suitable component used to transmit data. In some examples, the networking component(s) 101 may be in the form of switching components, routers, and/or firewalls. Other suitable examples of fiber (or other cable) fed devices may be used to securely place fiber or other cables between desired devices (e.g., between a customer demarcation device and a carrier fiber panel). The networking component or components 101 may include a data input 101a in the form of a port to receive a portion of the data cable 110. More specifically, the data cable 110, which may be in the form of a fiber optic or similar cable, may include a plug that is coupled with the data input 101a. The networking component 101 may be coupled with the backboard member 104 via the mounting regions 106 using any number of suitable approaches. More specifically, the networking component 101 may include a protrusion that engages a corresponding hole or opening formed by the mounting regions 106. Other arrangements are possible.

Figure 5:
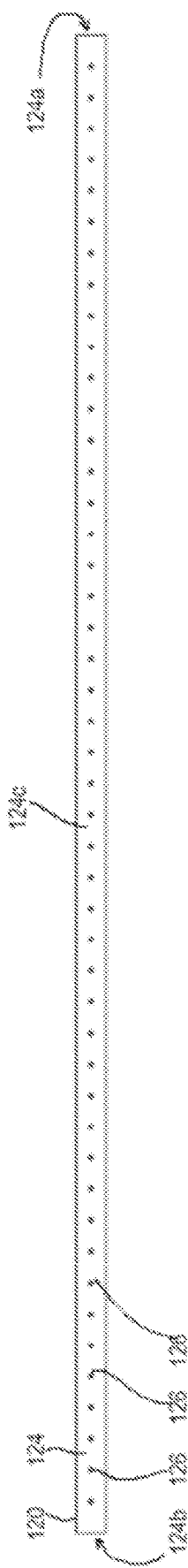
FIG. 5 is a rear elevation view of the example fiber trough member of FIGS. 2-4 in accordance with various embodiments.

The fiber trough member 120 includes an elongated base surface 124, a first elongated wall surface 128, and a second elongated wall surface 132. The elongated base surface 124 includes a first end 124a, a second end 124b, a body 124c extending therebetween, and any number of mounting members 126 disposed thereon. In the illustrated example (FIG. 5), the mounting members 126 are in the form of holes that may receive a bolt, screw, or other suitable fastener (e.g., ½" beveled screws) to be coupled with the corresponding mounting region 106 of the backboard member 104. However, other examples are possible. More specifically, in some arrangements, the mounting members 126 may be in the form of plugs or protrusions that are insertable into corresponding holes formed by the mounting region 106 of the backboard member 104. In yet other examples, an opposite arrangement may be provided whereby the mounting region 106 may include protrusions that are insertable into openings formed by the mounting members 126. Other arrangements are possible.

Figure 2:
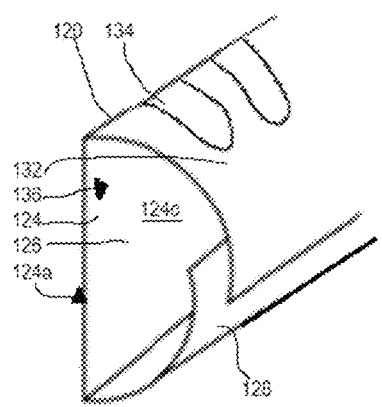
FIG. 2 is a perspective view of an example fiber trough member for use in the example environment of FIG. 1 in accordance with various embodiments.
Figure 3:
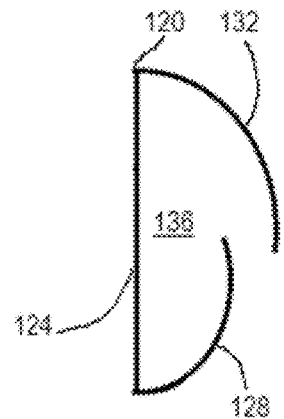
FIG. 3 is a side elevation view of the example fiber trough member of FIG. 2 in accordance with various embodiments.
Figure 4:
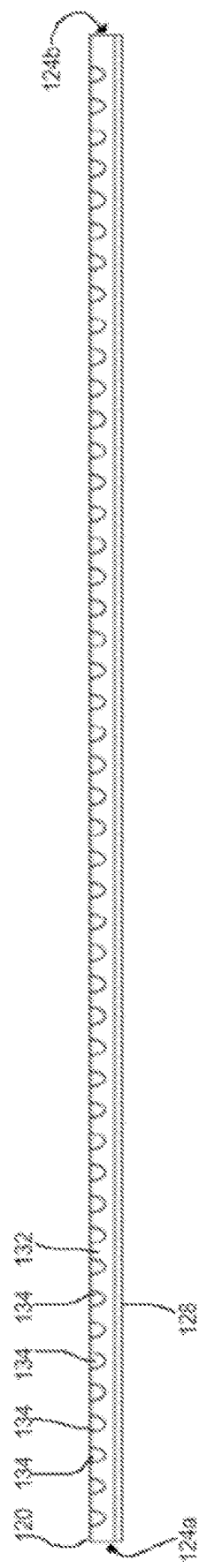
FIG. 4 is a front elevation view of the example fiber trough member of FIGS. 2 & 3 in accordance with various embodiments.

The first elongated wall surface 128 extends from the elongated base surface 124. As illustrated in FIGS. 2 & 3, in some examples, the first elongated wall surface 128 has a curved side profile. The second elongated wall surface 132 also extends from the elongated base surface 124, and in some examples, has a curved side profile. Notably, the first and the second elongated wall surfaces 128, 132 cooperate to overlap and define a trough cavity 136 that receives and/or otherwise accommodates the data cable(s) 110. Any or all of the components of the fiber trough member 120 may be constructed from a rigid, semi-rigid, and/or a resilient or otherwise flexible material (e.g., a polymeric material) to accommodate insertion of the data cable 110 into the trough cavity 136. In the illustrated examples, the first and second ends 124a, 124b of the elongated base surface 124 (and as a result, the fiber trough member 120 itself) are open such that the data cable(s) 110 may be inserted into the trough cavity 136 and ultimately pass therethrough.

The second elongated wall surface 132 additionally includes any number of routing openings 134 formed thereon. As illustrated in FIG. 1, these routing openings 134 allow the data cable 110 to be inserted or otherwise routed into the trough cavity 136 at locations other than the first and/or the second ends 124a, 124b of the elongated base surface 124.

Figure 6:
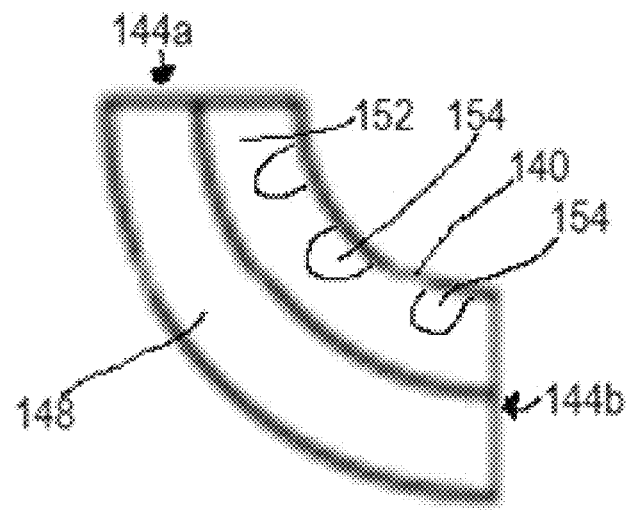
FIG. 6 is a front elevation view of an example angled fiber trough member for use in the example environment of FIG. 1 in accordance with various embodiments.
Figure 7:
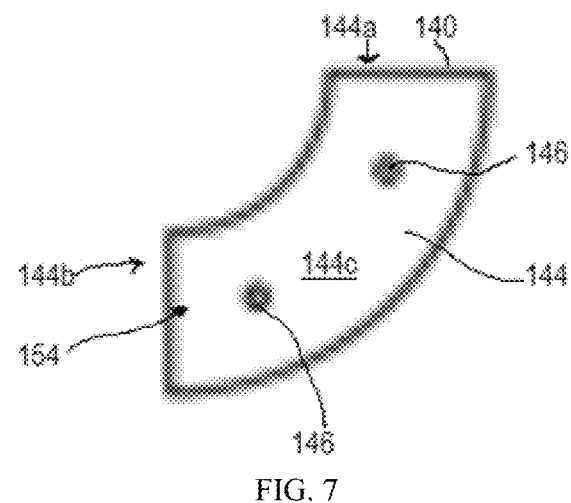
FIG. 7 is a rear elevation view of the example angled fiber trough member of FIG. 6 in accordance with various embodiments.

With reference to FIGS. 1, 6, & 7, in some examples, an angled fiber trough member 140 is also provided that includes an elongated base surface having a first end 144a, a second end 144b, a body 144c extending therebetween, and any number of mounting members 146, a first elongated wall surface 148, and a second elongated wall surface 152 having any number of routing openings 154. As illustrated in these figures, the first and second ends 144a, 144b of the elongated base surface 144 are oriented at an angle relative to each other. In these examples, the first and second ends 144a, 144b are approximately perpendicular to each other, but any other desired angle may be used.

Like the fiber trough member 120, the first and second elongated wall surfaces 148, 152 of the angled fiber trough member 140 have a generally curved side profile. The first and second elongated wall surfaces 148, 152 cooperate to define a trough cavity 156 to receive any number of data cables 110.

The mounting system 102 may be used as follows. In some arrangements, the networking component or components 101 are first coupled with the backboard member 104 (via the mounting regions 106), whereupon data cables 110 may be used to communicatively coupled varying components 101 (or other components not coupled with the backboard member 104 such as servers or other computing hardware). Prior to coupling the data cables 110 with the networking components 101 via the data input 101a, a user may secure any number of fiber trough members 120 and/or angled fiber trough members 140 with the backboard member 104 using the respective mounting members 126, 146 of the desired fiber trough member(s) 120 and/or angled fiber trough member(s) 140. A user may then route the data cable(s) 110 through the respective trough cavities 136, 156 by either inserting the data cable(s) 110 through the first and second ends of the respective fiber trough member 120 and/or angled fiber trough member 140, and/or by using the routing openings 134, 154. While the illustrated example of FIG. 1 depicts a number of data cables 110 routed through the routing opening 134 and the second end 124b of the elongated base surface 124, in some examples, the data cable(s) 110 may be routed through different routing openings 134, 154 and not through the first or second ends of the respective base surfaces 124, 144. Other arrangements are possible.

In the event additional data cables 110 and/or networking components 101 are desired in the environment 100, a user may use existing fiber trough members to route the data cables 110 and/or may couple additional fiber trough members to the backboard member 104.

Notably, the mounting system 102 described herein allows multiple fiber trough members 120 and/or angled fiber trough members 140 to be positioned adjacent to each other to form a longer cavity for routing the data cables 110. In some examples, the fiber trough member 120 and/or the angled fiber trough member 140 may be cut or otherwise shortened as needed, and further may be secured with each other via any number of interlocking mechanisms.

So arranged, the fiber troughs may advantageously provide a safe path for data cables 110 between locations and/or networking components 101 while shielding the data cables 110 from contact by external objects. The fiber troughs described herein do not require a lid or additional cover, thus allowing the data cables to be easily inserted and removed without needing to reaffix the troughs to the backboard. As compared with existing systems that require additional brackets to be mounted to wall, the present fiber troughs may be cheaper to manufacture and to use. Further still, because the fiber troughs do not require threaded rods, users needn't remove the fiber troughs to add or replace the data cables.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims.

By way of example, and not limitation, the disclosure herein contemplates at least the following examples:

1. A mounting system for an optical network, the mounting system comprising: a backboard member having a plurality of mounting regions; at least one networking component having a data input, the at least one networking component being operably coupled with the backboard member via one of the plurality of mounting regions; at least one data cable communicatively coupled with the at least one networking component via the data input; and at least one fiber trough member operably coupled with the backboard member, the at least one fiber trough member comprising: an elongated base surface having a first end, a second end, a body extending therebetween, a first elongated wall surface extending from the elongated base surface, the first elongated wall surface having a curved side profile, and a second elongated wall surface extending from the elongated base surface, the second elongated wall surface including at least one routing opening thereon, the second elongated wall surface adapted to at least partially overlap the first wall surface, wherein the elongated base surface, the first elongated wall surface, and the second elongated wall surface define a trough cavity; wherein the at least one data cable is adapted to be inserted within the trough cavity to be retained thereby.

2. The mounting system of example 1, wherein the elongated base surface of the at least one fiber trough member includes a plurality of mounting members adapted to couple with the backboard member.

3. The mounting system of example 1, wherein the at least one fiber trough member includes first and second open ends.

4. The mounting system of example 3, wherein the at least one data cable is selectively routable through: 1) the first and second open ends; or 2) the at least one routing opening and one of the first or second open ends of the at least one fiber trough member.

5. The mounting system of example 1, wherein the at least one fiber trough member is constructed from a polymeric material.

6. The mounting system of example 1, wherein the at least one fiber trough member is constructed from a resilient material.

7. The mounting system of example 1, further comprising at least one angled fiber trough member, the at least one angled fiber trough member comprising: an elongated base surface having a first end, a second end, and a body extending therebetween, the first end and the second ends being oriented at an angle relative to each other, a first elongated wall surface extending from the elongated base surface, the first elongated wall surface having a curved side profile, and a second elongated wall surface extending from the elongated base surface, the second elongated wall surface including at least one routing opening thereon, the second elongated wall surface adapted to at least partially overlap the first wall surface.

8. A fiber trough for retaining at least one optical fiber cable, the fiber trough comprising: an elongated base surface having a first end, a second end, a body extending therebetween; a first elongated wall surface extending from the elongated base surface, the first elongated wall surface having a curved side profile; and a second elongated wall surface extending from the elongated base surface, the second elongated wall surface including at least one routing opening thereon, the second elongated wall surface adapted to at least partially overlap the first wall surface.

9. The fiber trough of example 8, wherein the elongated base surface of the at least one fiber trough member includes a plurality of mounting members adapted to couple with a backboard member.

10. The fiber trough of example 8, wherein the at least one fiber trough member includes first and second open ends.

11. The fiber trough of example 10, wherein at least one data cable is selectively routable through: 1) the first and second open ends; or 2) the at least one routing opening and one of the first or second open ends.

12. The fiber trough of example 8, wherein the fiber trough member is constructed from a polymeric material.

13. The fiber trough of example 8, wherein the fiber trough member is constructed from a resilient material.

14. The fiber trough of example 8, wherein the first end and the second ends of the base member are oriented at an angle relative to each other.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A mounting system for an optical network, the mounting system comprising:
   a backboard member having a plurality of mounting regions;
   at least one networking component having a data input, the at least one networking component being operably coupled with the backboard member via one of the plurality of mounting regions;
   at least one data cable communicatively coupled with the at least one networking component via the data input; and
   at least one fiber trough member operably coupled with the backboard member, the at least one fiber trough member comprising:
      an elongated base surface having a first end, a second end, a body extending therebetween,
      a first elongated wall surface extending from the elongated base surface, the first elongated wall surface having a curved side profile, and
      a second elongated wall surface extending from the elongated base surface, the second elongated wall surface including at least one routing opening thereon, the second elongated wall surface adapted to at least partially overlap the first wall surface,
      wherein the elongated base surface, the first elongated wall surface, and the second elongated wall surface define a trough cavity;
      wherein the curved side profile of first elongated wall surface extends from the elongated base surface to a first distal end and wherein the second elongated wall surface extends with a curved side profile from the elongated base surface to a second distal end, the second distal end overlapping the first distal end;
   wherein the at least one data cable is adapted to be inserted within the trough cavity to be retained thereby.

2. The mounting system of claim 1, wherein the elongated base surface of the at least one fiber trough member includes a plurality of mounting members adapted to couple with the backboard member.

3. The mounting system of claim 1, wherein the at least one fiber trough member includes first and second open ends.

4. The mounting system of claim 3, wherein the at least one data cable is selectively routable through: 1) the first and second open ends; or 2) the at least one routing opening and one of the first or second open ends of the at least one fiber trough member.

5. The mounting system of claim 1, wherein the at least one fiber trough member is constructed from a polymeric material.

6. The mounting system of claim 1, wherein the at least one fiber trough member is constructed from a resilient material.

7. The mounting system of claim 1, further comprising at least one angled fiber trough member, the at least one angled fiber trough member comprising:
   an elongated base surface having a first end, a second end, and a body extending therebetween, the first end and the second ends being oriented at an angle relative to each other,
   a first elongated wall surface extending from the elongated base surface, the first elongated wall surface having a curved side profile, and
   a second elongated wall surface extending from the elongated base surface, the second elongated wall surface including at least one routing opening thereon, the second elongated wall surface adapted to at least partially overlap the first wall surface.

8. A fiber trough for retaining at least one optical fiber cable, the fiber trough comprising:
   an elongated base surface having a first end, a second end, a body extending therebetween;
   a first elongated wall surface extending from the elongated base surface, the first elongated wall surface having a curved side profile; and
   a second elongated wall surface extending from the elongated base surface, the second elongated wall surface including at least one routing opening thereon, the second elongated wall surface adapted to at least partially overlap the first wall surface,
   wherein the curved side profile of first elongated wall surface extends from the elongated base surface to a first distal end and wherein the second elongated wall surface extends with a curved side profile from the elongated base surface to a second distal end, the second distal end overlapping the first distal end.

9. The fiber trough of claim 8, wherein the elongated base surface of the at least one fiber trough member includes a plurality of mounting members adapted to couple with a backboard member.

10. The fiber trough of claim 8, wherein the at least one fiber trough member includes first and second open ends.

11. The fiber trough of claim 10, wherein at least one data cable is selectively routable through: 1) the first and second open ends; or 2) the at least one routing opening and one of the first or second open ends.

12. The fiber trough of claim 8, wherein the fiber trough member is constructed from a polymeric material.

13. The fiber trough of claim 8, wherein the fiber trough member is constructed from a resilient material.

14. The fiber trough of claim 8, wherein the first end and the second end of the base member are oriented at an angle relative to each other.

* * * * *